United States Patent [19]

Mannl

[11] Patent Number: 4,898,605
[45] Date of Patent: Feb. 6, 1990

[54] GLASS VESSEL IN PARTICULAR, AN AMPOULE AND A METHOD FOR TREATING THE GLASS VESSEL

[75] Inventor: Reinhard Mannl, Mitterteich, Fed. Rep. of Germany

[73] Assignee: Schott Ruhrglas GmbH, Postfach, Fed. Rep. of Germany

[21] Appl. No.: 370,053

[22] Filed: Apr. 21, 1989

Related U.S. Application Data

[63] Continuation of Ser. No. 46,383, May 6, 1987, abandoned.

[30] Foreign Application Priority Data

May 6, 1986 [DE] Fed. Rep. of Germany ....... 3615287

[51] Int. Cl.$^4$ ............................................. C03B 33/09
[52] U.S. Cl. ........................................ 65/113; 65/105; 65/112; 65/120; 65/30.14
[58] Field of Search ................. 65/105, 112, 113, 120, 65/30.14

[56] References Cited

U.S. PATENT DOCUMENTS 2,517,604 8/1950 Smith .............................. 65/105 UX
3,535,070 10/1970 Francel et al. .................... 65/112 X

*Primary Examiner*—Arthur Kellogg
*Attorney, Agent, or Firm*—Nies, Webner, Kurz & Bergert

[57] ABSTRACT

A glass vessel, in particular an ampoule, having a prestress produced at a predetermined spot of the vessel which permits an automatic opening of the vessel at the predetermined spot following scratching by means of a suitable tool. The prestress, which is produced exclusively by means of an earlier thermal treatment without the application of a tool exhibits a stress profile in which an initially produced annular tensile stress ring, is overlapped at a predetermined spot by a point-shaped compressive stress zone that is produced subsequently.

9 Claims, 1 Drawing Sheet

FINE-POINTED BURNER →

BURNER

TENSILE STRESS

COMPRESSIVE STRESS

FINE-POINTED BURNER

TENSILE STRESS

COMPRESSIVE STRESS

GLASS VESSEL IN PARTICULAR, AN AMPOULE AND A METHOD FOR TREATING THE GLASS VESSEL

This application is a continuation of application Ser. No. 46,383, filed May 6, 1987 now abandoned.

FIELD OF THE INVENTION

The present invention relates to a glass vessel, especially an ampoule, which is prepared for and is capable of, being opened at a predetermined point on the side of the vessel. The invention further relates to a method for the treatment of such a vessel so as to prepare it for subsequent opening.

BACKGROUND OF THE INVENTION

A known technique of closing ampoules, vials, and similar glass vessels which have been filled with materials is by sealing the open end in a flame. In this manner, the contents of the vessel are protected, until their use, against impurities, evaporation or sublimation.

Reopening of such hermetically sealed glass vessels in the easiest manner possible is fraught with many problems. The most usual method of reopening such sealed glass vessels consists of breaking the neck of the vessel, after a fracture line has been scratched with a file at the desired point in the glass surface. This method has the disadvantage that, when the ampoule neck is broken off, fine glass splinters are produced which contaminate the ampoule contents. Moreover, the person who opens the ampoule can be injured.

German Pat. No. DE-PS 867,291 teaches applying a substance, e.g. fused enamel, at a predetermined location along the line of fracture for the breaking of an ampoule. The coefficient of thermal expansion of the applied substance is larger than that of the ampoule glass, so that a tensile stress arises in the glass upon cooling of the applied substance, which favors a break at this location. This enamel fusion process is, as can be easily ascertained, very labor-intensive and leads to surface cracks due to the difference thermal expansion of the materials.

In accordance with another process disclosed in British Pat. No. GB-PS 762,857, a transverse notch is made on the neck of an ampoule by means of scratching, cutting, etching, or some other similar manner, and the glass is thus weakened at this location (predetermined breaking point). Since the degree of damage to the glass surface cannot be determined precisely, this process has the disadvantage that the ampoule can break prematurely.

It has also been proposed to solidify stresses at a predetermined breaking point by means of heating and cooling the vessel, and to open the vessel by damaging the glass at this breaking point with a suitable tool. A process is described in German Patents DE-PS 554,146, DE-PS 595,725, and DE-PS 683,259, in which a cold tool is brought into contact with the still plastic glass at the prescribed breaking point during the moulding of the vessel. In this way, stresses are produced in a predetermined zone of the glass side. Contact of the ampoule interior wall with a cooling tool for the purpose of producing stress is, even with current manufacturing methods, not realizable at all. The vessel can be opened by means of superficial scratching at a spot of this stress zone. More precisely, in the process specified in these three German Patents, a stress ring is formed that runs around the perimeter of a glass vessel, for example an ampoule, and this stress ring is composed of alternating tensile stress points and compressive stress points. This process has the disadvantage that, when the still plastic glass is brought into contact with the cold tool, surface defects arise, such as microcracks, weld points, breaks or other similar defects, with the result that a surface-damaged glass vessel is produced which can break prematurely. Moreover, the process specified in these three German Patents is problematic.

In order that a crack running around the entire perimeter of the ampoule can form at a subsequent superficial scratching, the alternating compressive and tensile stresses must be high enough, and the interval between two stress points must not be so large that the crack comes to a stop. These conditions are met with such difficulty that this process, although it looks promising, has never found acceptance since it was proposed over fifty years ago.

OBJECTS OF THE INVENTION

It is therefore a principal object of the present invention to pretreat a glass vessel in such a manner as to provide a predetermined breaking point in the form of thermally produced prestresses, where the prestreses have a stress profile which, given a subsequent superficial injury to the glass surface at the predetermined point, will facilitate opening of the glass vessel automatically with safety.

A further object of the present invention is to provide a method of treating such a glass vessel so as to produce such prestresses in the glass, whereby surface damage is to be avoided.

BRIEF DESCRIPTION OF THE DRAWINGS

The foregoing objects are attainable with a glass vessel, and a method of preparing such a vessel, as set forth in the following detailed description of the invention. Moreover, these and other objects and advantages will become more apparent upon consideration of the following description of the invention when taken in conjunction with the drawings, in which.

DETAILED DESCRIPTION OF THE INVENTION

Figure 1:
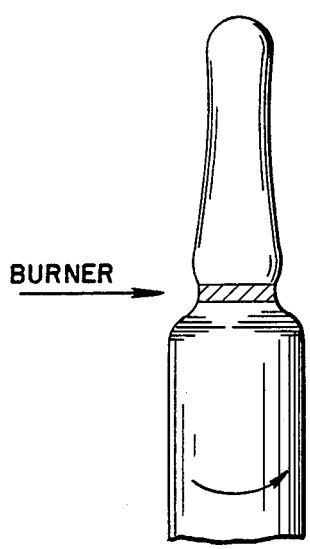
FIG. 1 illustrates stress zone formed in the neck of a glass vessel.
Figure 2:
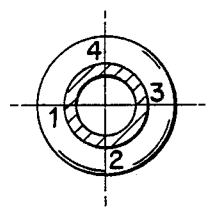
FIG. 2 illustrates a cross-sectional view of the stress zone of FIG. 1 taken along section lines 2—2 in FIG. 1.
Figure 4:
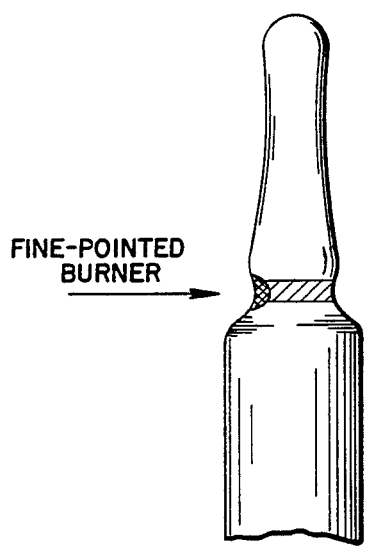
FIG. 4 shows a second, point-shaped stress zone superimposed on the first stress zone of FIG. 1 at the neck of a glass vessel.
Figure 5:
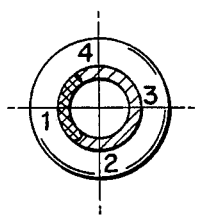
FIG. 5 is a cross-sectional view through the neck of the glass vessel of FIG. 4 taken along section line 5—5 in FIG. 4.

Referring now to the drawings, it can be seen that a glass vessel prepared according to the invention is characterized by an annular prestress zone, which consists of an initially produced tensile stress ring (as shown in FIGS. 1 and 2) on which a point-shaped compressive stress zone is superimposed at a preselected spot (as shown in FIGS. 4 and 5). As shown graphically in FIG. 6, the point of maximum tensile stress is located at the preselected spot of this complex prestress ring, more specifically at the spot lying diametrically opposite to the point-shaped compressive stress zone produced later. Surprisingly, it has been found that, if a slight scratch or similar surface damage is produced on the specified prestress ring, preferably at the point specified earlier of maximum tensile stress, for example by means of a faint scratching with a suitable tool, a resultant crack produced runs linearly along the annular prestress zone. The result is that the glass vessel separates by itself into two parts along this crack in a short amount of time, ranging from fractions of a second up to a few seconds. This time can be adjusted purposefully through the amount of the prestress. The point on the annular prestress zone, at which the scratching tool is to be applied, is appropriately marked by means of a suitable marking, for example a red line.

The process according to the invention consists of providing a first annular prestress zone, which is a tensile stress zone, on the glass vessel in a plane that lies normal to the axial direction of the vessel, and thereafter, when the vessel has sufficiently cooled or has been cooled, providing a second, point-shaped prestress zone at a spot on the first annular tensile stress zone. Whereas the first prestress zone is a tensile stress zone, the second prestress zone, which is superimposed on the first prestress zone, constitutes a compressive stress zone.

Figure 3:
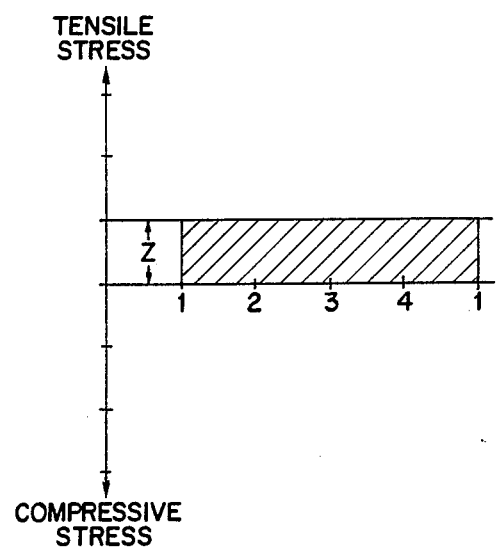
FIG. 3 graphically depicts the stress value at various locations in the stress zone of FIG. 1.
Figure 6:
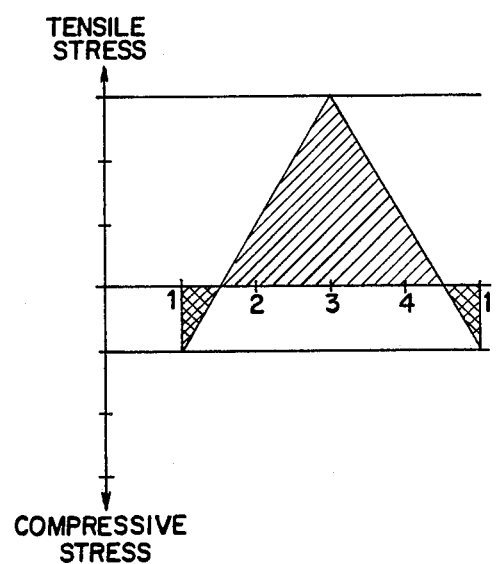
FIG. 6 is a graphic representation of the stress values at various locations in the stress zone of FIG. 4.

In this way, a stress profile is formed as shown in FIGS. 3 and 6 such that by means of annular heating of the glass vessel on its perimeter, a first tensile stress ring is formed (FIG. 1) having a prestress value of z (FIG. 3), and by means of point-shaped heating at a spot of the tensile stress ring (FIG. 4), a compound compressive-tensile stress profile forms, a diagrammatic representation of which is given in FIG. 6.

Heating of the glass vessel so as to produce a tensile stress ring takes place with relative motion of the vessel to a heat source, which is preferably a flame. After that, the heated glass vessel is allowed to cool. The cooling can be accelerated, as for example by means of cold compressed air.

According to another specific embodiment of the invention, the glass vessel, which has been heated as a whole, can be cooled along the annular tensile stress zone.

Point-shaped heating on the tensile stress ring so as to produce the compressive stress zone is also preferably effected by means of a flame, a suitable fine-pointed burner. In so doing, the glass should be heated above its transformation temperature.

The treatment described of the glass vessel is not tied to a definite point in time during fabrication of the vessel or during its subsequent processing or use. The treatment according to the invention can directly follow the fabrication of the vessel, for example the ampoule, and it can be undertaken before the filling of the vessel.

The present invention will be more clearly appreciated from the following description of an exemplary embodiment.

A glass ampoule, annealed (cooled) following its fabrication, is heated on the ampoule neck by passing the ampoule, which is rotating around its longitudinal axis, over a stationary burner. In so doing, the glass heats along an annular zone to about 700° C. An annular tensile stress zone thus forms on the perimeter of the ampoule neck.

As an alternative to rotating the ampoule around its longitudinal axis while subjecting the ampoule to a stationary heat source, the heat source can be made to rotate about a stationary ampoule to thereby produce the annular tensile stress zone on the ampoule neck.

Thereafter, a predetermined spot on the tensile stress ring is heated at a point to about 800° C. by means of a fine-pointed burner, whereby an additional, closely delimited prestress zone is produced; at this spot, therefore, two prestresses overlap.

The spot at which a scratching tool is to be applied for the purpose of subsequently opening the glass vessel is marked with a thin red color band applied in an appropriate manner on the vessel; this is the spot on the ampoule neck which lies approximately diametrically opposite to the spot at which the ampoule had been heated at a point.

Moreover, a coating may be applied on the zone of the overlapping prestresses as well as on the neighboring zones. The coating may consist of a well-known coating material, such as plastic or lubricant, which conserves the undamaged state of the glass surface.

The scratching tool is suitably an inexpensive disposable tool, as for example, a sheet-metal strip or a strip made out of compressed cardboard which is coated on one edge with carbon silicide, or a carbide file. The packing cardboard for the glass vessels according to the invention can also be constituted in such a way that one of its edges is prepared as a scratching tool.

If necessary, the scratching tool can also be designed in such a way that, simultaneously with the scratching process, glass particles that are produced are wiped off outside.

The time to open, from scratching to the breaking off of the ampoule tip, can be influenced by the size of grain of the scratching tool.

The glass vessels of the present invention exhibit numerous advantages and virtues over all previously known glass vessels that are opened by breaking. For example, opening of the vessels occurs without the breaking having to be preformed by hand. Further, no glass splinters occur on the inner surface which can come into contact with the contents, and the glass vessel retains up to the desired opening, an undamaged surface, with the result that no damage during transport need be feared. Additionally, the glass vessel can be kept still at the time, since its tip breaks off automatically, so that a liquid contained in the vessel does not move, and cannot, for example, spill. Further yet, the pretreatment of the glass vessel is simple and not labor-intensive, and can be performed by means of equipment existing in manufacturing plants for glass vessels. Finally, the diminished pressure arising in the interior upon closing of the ampoule is equalized at the opening process through the microcrack, before the ampoule neck breaks off. In this way, a spilling of the ampoule contents at the point of separation is avoided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of forming a pre-stressed strip in a glass vessel such as an ampoule to facilitate the opening of the vessel along the strip, said method comprising forming in a portion of said vessel designated for placement of the pre-stressed strip, a tensile stress zone solely by heating said zone, and after said zone has cooled forming in said zone a short compressive stress zone solely by heating a short section of said tensile stress zone.

2. The method of claim 1, wherein said step of forming said tensile stress zone comprises subjecting an elongated portion of said vessel to a flame while imparting relative motion to said vessel and said flame.

3. The method of claim 2, wherein said step of imparting relative motion comprises moving said vessel relative to said flame.

4. The method of claim 2, wherein said step of imparting relative motion comprises rotating said vessel about an axis thereof whereby said first stress zone constitutes a continuous strip-like region.

5. A method of forming a pre-stressed strip in a glass vessel such as an ampoule to facilitate the opening of the vessel along the strip, said method comprising forming in a portion of said vessel designated for placement of the pre-stressed strip, an annular tensile stress zone solely by thermal treatment of said zone, and thereafter forming in said tensile stress zone a short compressive stress zone solely by thermal treatment of a short section of said tensile stress zone.

6. The method of claim 5, wherein said step of forming said annular tensile stress zone comprises heating the vessel while moving the vessel relative to a heat source.

7. The method of claim 5, wherein said step of forming said annular tensile stress zone comprises first heating, and then cooling, the vessel, said cooling step being performed while the vessel is moved relative to a cooling source.

8. The method of claim 5, wherein said step of forming said annular tensile stress zone further comprises actively cooling said vessel after heating said vessel.

9. The method of claim 5, wherein said step of heating the vessel is effected by means of a flame.

* * * * *